United States Patent [19]
Durnil

[11] Patent Number: 6,145,652
[45] Date of Patent: Nov. 14, 2000

[54] VIBRATING CONVEYOR SYSTEM WITH SLIDING ECCENTRIC WEIGHTS

[75] Inventor: Michael W. Durnil, Louisville, Ky.

[73] Assignee: Carrier Vibrating Equipment, Inc., Louisville, Ky.

[21] Appl. No.: 09/093,127

[22] Filed: Jun. 8, 1998

[51] Int. Cl.[7] .................................................. B65G 27/32
[52] U.S. Cl. ........................ 198/753; 198/763; 198/770
[58] Field of Search .................................... 198/753, 763, 198/770; 74/61, 87

[56] References Cited

U.S. PATENT DOCUMENTS

| | | | |
|---|---|---|---|
| 2,374,663 | 1/1945 | Carrier, Jr. | 198/753 |
| 3,145,831 | 8/1964 | Roder et al. | 198/753 |
| 4,176,983 | 12/1979 | Gardner | 198/770 |
| 4,218,929 | 8/1980 | Spurlin | 198/770 |
| 4,354,618 | 10/1982 | Weyandt | 198/753 |
| 5,064,053 | 11/1991 | Baker | 198/770 |
| 5,314,058 | 5/1994 | Graham | 198/753 |
| 5,615,763 | 4/1997 | Schieber | 198/770 |
| 5,934,446 | 8/1999 | Thomson | 198/753 |

FOREIGN PATENT DOCUMENTS

| | | | |
|---|---|---|---|
| 606585 | 10/1960 | Canada | 198/770 |

*Primary Examiner*—Douglas Hess
*Attorney, Agent, or Firm*—Joan L. Simunic; Vance A. Smith; Stites & Harbison

[57] ABSTRACT

A vibrating conveying system having a plurality of rotating shafts and associated eccentric weights uses a sliding eccentric weight or weights mounted on one or more driving shafts to reverse the movement of the articles carried by the conveyor. The sliding weights move between first and second spaced positions relative to the driving shaft when the rotation of the driving shaft is reversed and are latched into place once in the selected positions preventing further movement while the apparatus is operating.

13 Claims, 6 Drawing Sheets

VIBRATING CONVEYOR SYSTEM WITH SLIDING ECCENTRIC WEIGHTS

BACKGROUND OF THE INVENTION

This invention is related to a mechanical vibrating drive system for a vibratory conveyor apparatus and, more particularly, to a vibratory conveyor apparatus utilizing a set of eccentric rotating weights to impart a resultant vibratory drive force to the conveyor apparatus.

Eccentric weight drive systems for providing linear force generation to vibratory conveyor apparatus are known per se. The systems typically operate to change either the direction or the magnitude of a force applied to a trough mounted to a stationary support through a plurality of elastic members such as springs. The systems utilize a plurality of rotating shafts and associated eccentric weights to supply a cyclical force to the vibratory trough. A mechanism in the system is used to adjust the relative positioning of one or more of the rotating shafts carrying the eccentric weights. Varying the relative positioning of the rotating shafts and eccentric weights varies the direction of the maximum throw to the trough of the conveyor.

An example of a system utilizing fixed eccentric rotating weights for changing the force direction is described in detail in U.S. Pat. No. 5,064,053 assigned to the same assignee as the present invention. In the system of the '053 patent, a single rotating shaft bearing an eccentric weight is in a parallel relationship with and positioned between paired additional rotating shafts bearing eccentric weights. The centered single shaft rotates in one direction while the paired shafts rotate in the opposite direction but at the same number of revolutions per minute. In any 360° rotation of the shafts, all eccentric weights will be oriented so that the centrifugal forces, due to rotation of the eccentric weights, will be in the same direction, i.e., at the same angle with respect to the horizontal plane twice in the rotation. This provides a maximum resultant force, the aggregate centrifugal force, each time in that direction. Similarly, a minimum resultant force will be experienced twice in a 360° rotation. By varying the orientation of the single shaft with respect to the paired shafts, the "phase angle" relationship between the single rotating shaft and the paired rotating shafts, can be changed, thus changing the direction of "angle of attack" of the maximum resultant force supplied to the trough.

When a vibratory conveyor apparatus is used to transfer product, there is frequently the need to reverse the flow of the product being conveyed. While electronic drive capabilities such as described in U.S. Pat. No. 5,615,763 assigned to the same assignee as the present invention allow for a rapid change of direction of flow of the product, such systems are expensive. It would be far more desirable in many applications of moving product to use a mechanical system in which the shafts of the conveyor are driven by a common drive to change the product flow direction. However, to reverse the flow in such mechanical systems requires considerable down time of the system as it is necessary to physically change the positioning of one or more of the eccentric weights so that the resultant force is directed in the opposite quadrants. This becomes a labor intensive and costly procedure that is highly undesirable when the vibratory apparatus is a critical part of the process. Thus, there is a paramount need for a mechanical vibrating drive system that will allow the user to easily change the direction of flow of the conveyed product without incurring the down time of the system heretofore necessary with prior art mechanical vibrating drive systems.

SUMMARY OF TEE INVENTION

A vibrating conveying system for changing or maintaining a resultant vibratory force supplied to a conveyor trough meeting the above objectives generally comprises a support base that is connected to a conveyor trough by a plurality of springs. The mechanism for supplying the force to vibrate the trough includes at least one shaft with eccentric weights mounted so that the weights can freely rotate and slide about the shaft through a limited angular position range between a first position and a second position. The change in the angular position changes the angle of attack sufficient to reverse the direction of flow of the conveyed product. To ensure that the phase angle relationship remains constant once the weight has reached the position, the eccentric weights are detained in the position by a releasable latching mechanism. The latching mechanism remains latched as long as the direction of the shaft is not reversed. Once the shaft rotation is reversed, the latching mechanism releases the weights so that they can slide or rotate to the other of the two positions and the weights are again latched into place.

Other objects of the present invention will become readily apparent to those skilled in the art from the following description and appended drawings wherein there is shown and described a preferred embodiment of the present invention. As it will be realized, the invention is capable of other and different embodiments, and its several details are capable of modifications in various, obvious aspects, all without departing from the invention. Accordingly, the drawing and descriptions will be regarded as illustrative in nature and not restrictive.

DETAILED DESCRIPTION OF THE DRAWINGS

FIG. 1A is a side view of an isolating spring used to isolate the conveyor trough from the stationary support;

DETAILED DESCRIPTION OF THE PREFERRED EMBODIMENT

The conveyor system depicted in the various Figures is a three shaft eccentric weight system driven by a single motor and selected solely for purposes of illustrating the invention. Other and different eccentric weight systems may utilize the inventive features described herein as well.

Figure 1:
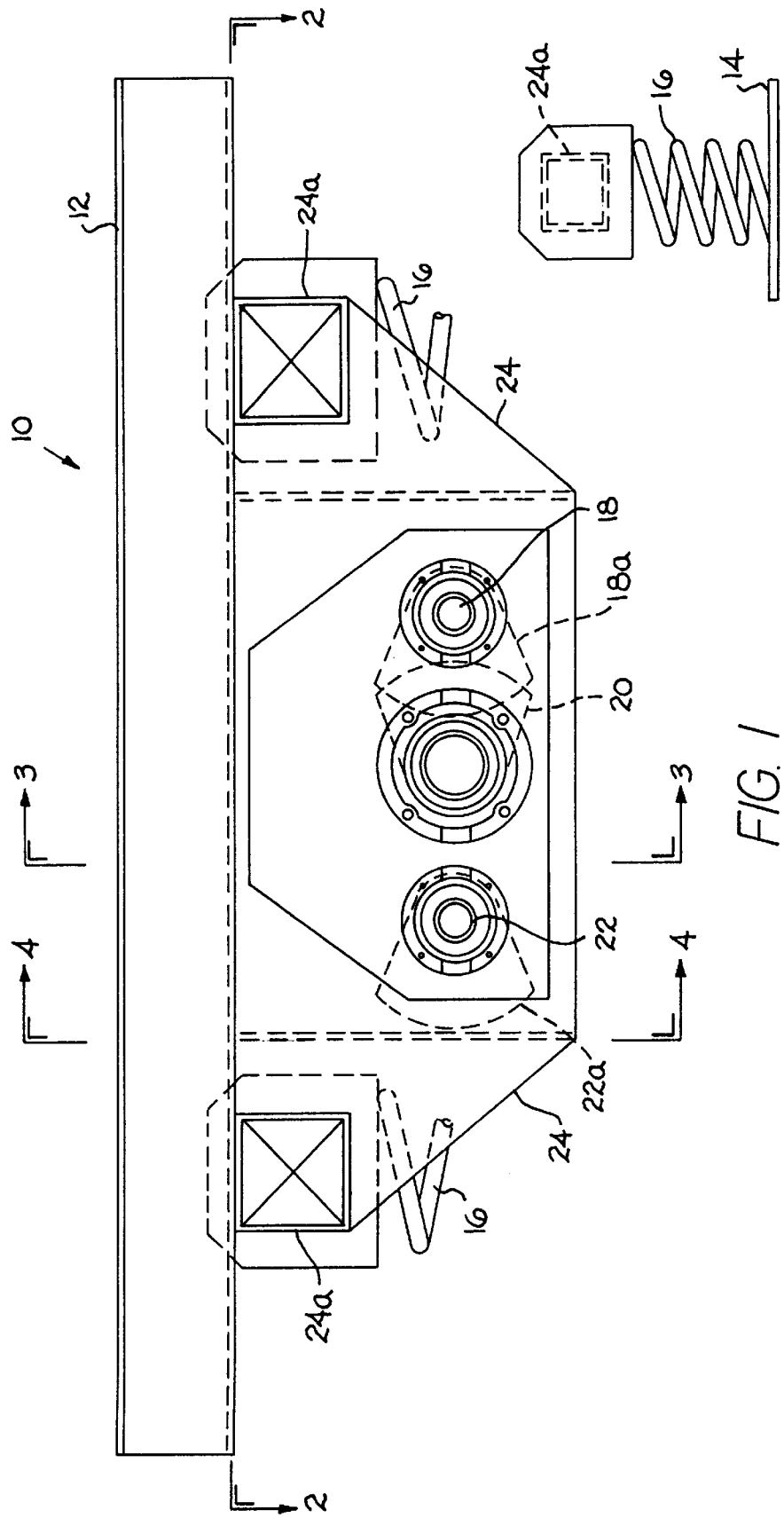
FIG. 1 is a schematic of an embodiment of the present invention showing a side view of a mechanical vibratory conveyor apparatus having eccentric weights mounted on rotating shafts to impart a vibratory motion to the conveying trough.
Figure 2:
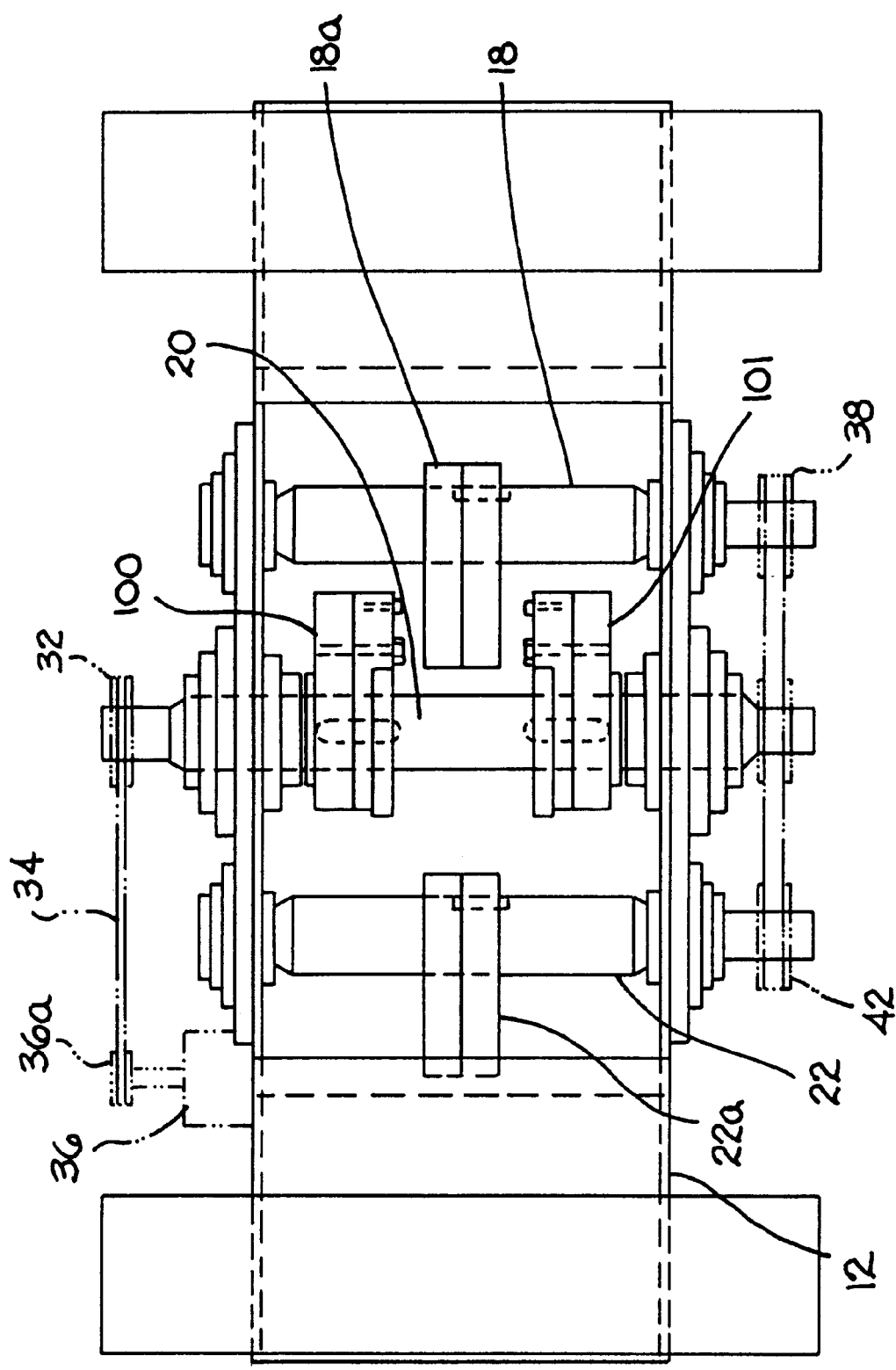
FIG. 2 is a bottom view of the vibratory apparatus of the present invention showing the respective location of the eccentric weights and shaft driving elements.
Figure 2A:
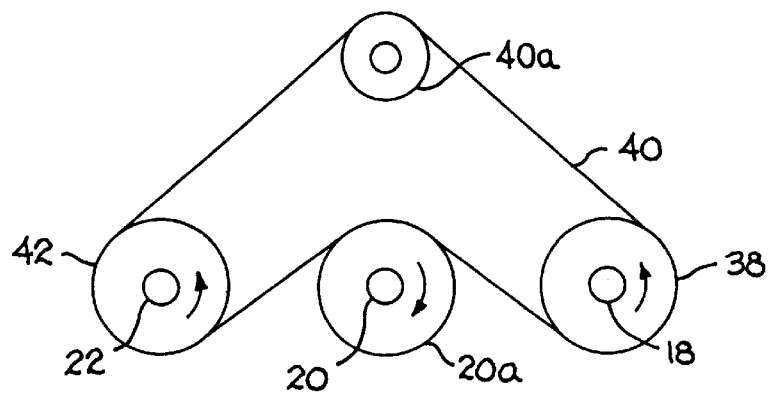
FIG. 2A is a schematic showing the central shaft being driven by a single motor and in turn driving the two outboard shafts in an opposite rotational direction.
Figure 3:
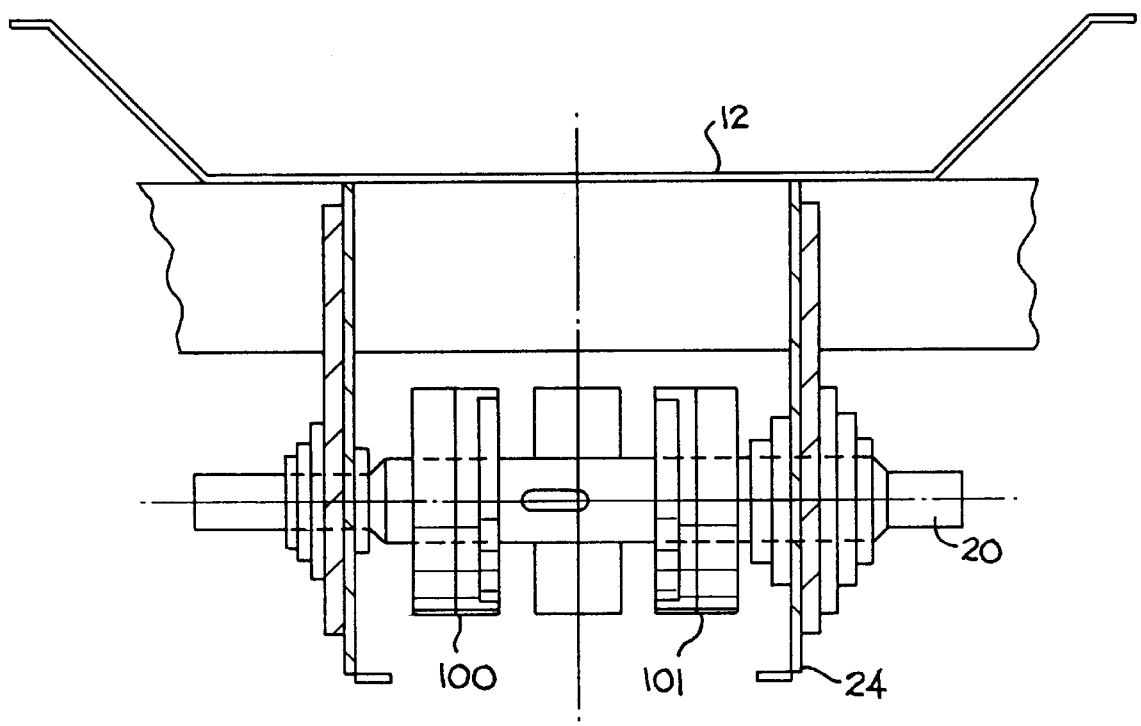
FIG. 3 is a sectional view of the apparatus illustrated in FIG. 1 along lines 3—3.
Figure 4:
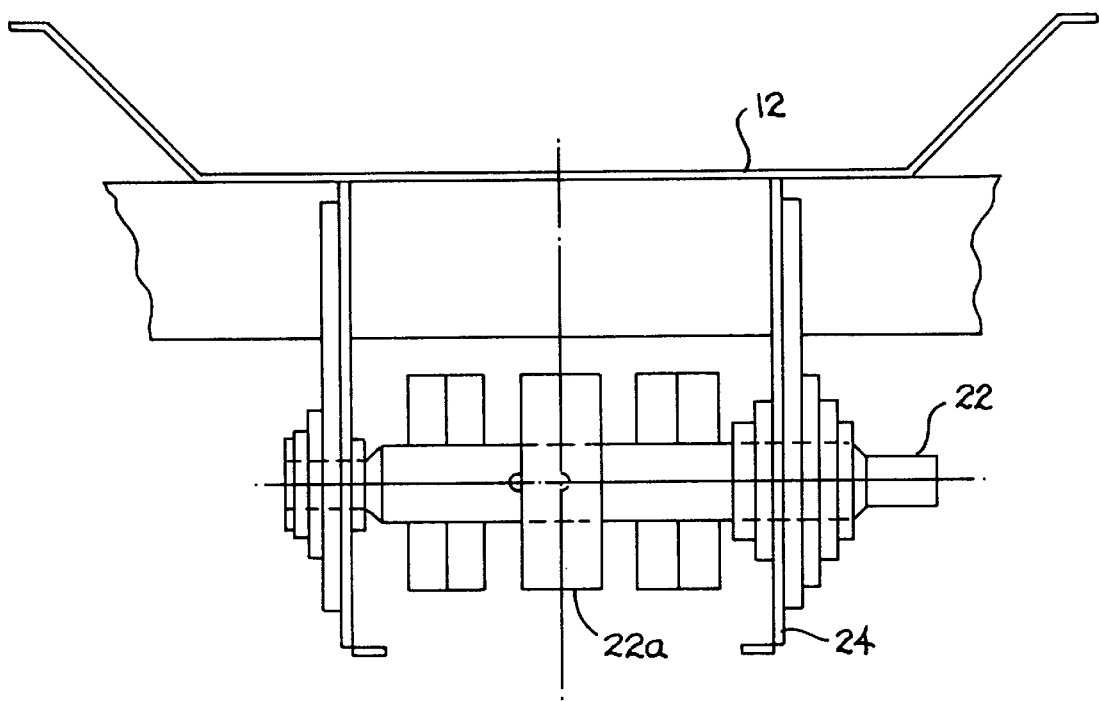
FIG. 4 is a sectional view of the apparatus illustrated in FIG. 1 along lines 4—4.

Reference is first made to FIGS. 1 through 4 in which the three shaft eccentric weight conveyor system constructed in accordance with the present invention is generally noted by the character numeral 10. A vibratory trough 12 is mounted to but isolated from a stationary base 14 by a plurality of isolating springs 16 shown schematically by the "X" within the square structural tubing 24a (comprising a portion of a frame) in FIG. 1 and as a coiled spring in FIG. 1A. Three shafts 18, 20 and 22, are mounted for rotational movement within a frame 24, preferably secured to the under carriage of trough 12. As best seen in FIGS. 2 and 2A, shaft 20 is provided with a pulley 32 that is driven by a belt 34 from a pulley 36a of a motor 36. The other end of shaft 20 has a central shieve 20a that drives a double sided gear belt 40 that in turn drives pulleys 38 and 42 connected respectively to shafts 18 and 22. An idler 40a provides the proper tension to the gear belt 40. As shown by the directional arrows, the shafts 18 and 22 are driven in the opposite rotational directions of shaft 20. Thus, in this manner the single motor 36 is able to drive all three shafts 18, 20 and 22.

Shafts 18 and 22, respectively, have eccentrically mounted weights 18a and 22a positioned intermediate the ends thereof, as illustrated in FIG. 2. Preferably the weights 18a and 22a have the same mass and angular orientation with respect to their respective associated shafts. Similarly, shaft 20 has a pair of spaced apart, eccentrically mounted weights 100, 101 intermediate the ends thereof (see FIG. 3). Preferably the total mass of weights 100, 101 are approximately twice those of the individual masses of weights 18a and 22a. The theory of operation of an eccentric weight vibratory conveyor having the capability to alter the speed and direction of the material carried by the conveyor is explicitly described in the aforementioned U.S. Pat. No. 5,064,053, incorporated by way of reference herein. Briefly, however, and as described above, such conveyor system operates upon the principal of altering the direction of the maximum resultant force acting on the conveyor due to the centrifugal forces imparted by the rotating eccentric weights. The magnitude of the resultant force acting on the conveyor goes between a maximum and a minimum in a sinusoidal manner. The direction of the maximum resultant force is dependent upon the relative phase angle between the position of the rotating weights.

Figure 5:
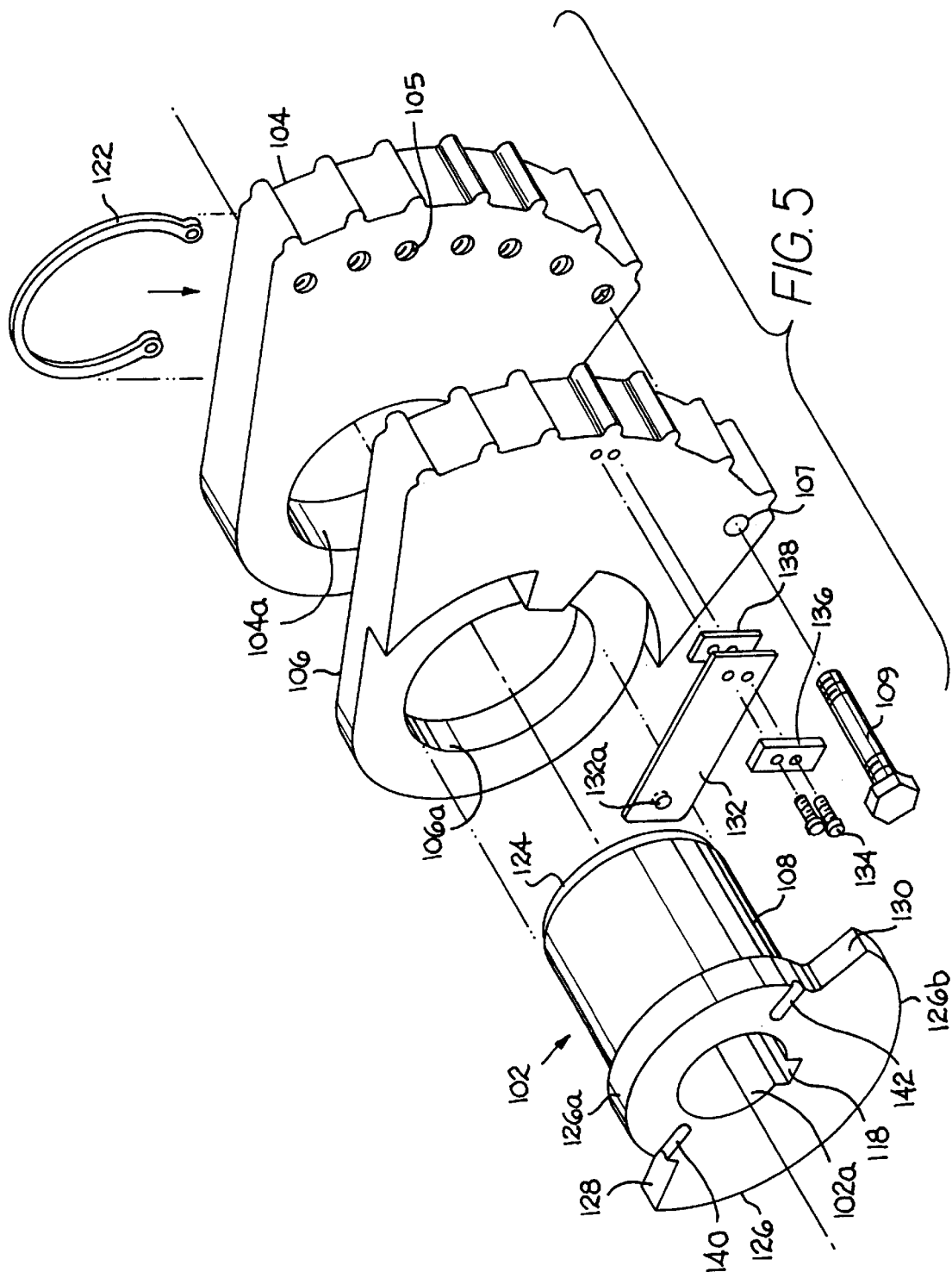
FIG. 5 is a perspective view of one vibratory eccentric weight assembly constructed in accordance with the present invention.
Figure 6:
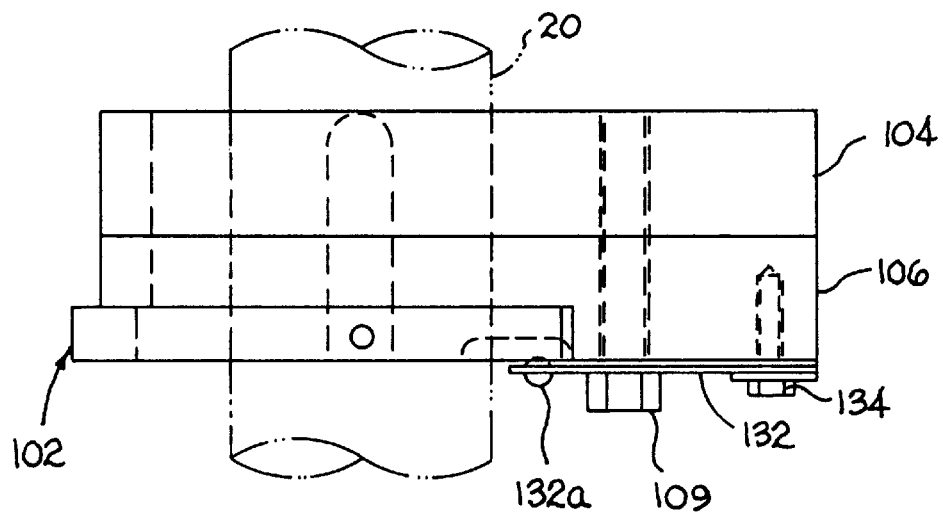
FIG. 6 is top view of the vibratory eccentric weight assembly of FIG. 5.
Figure 7:
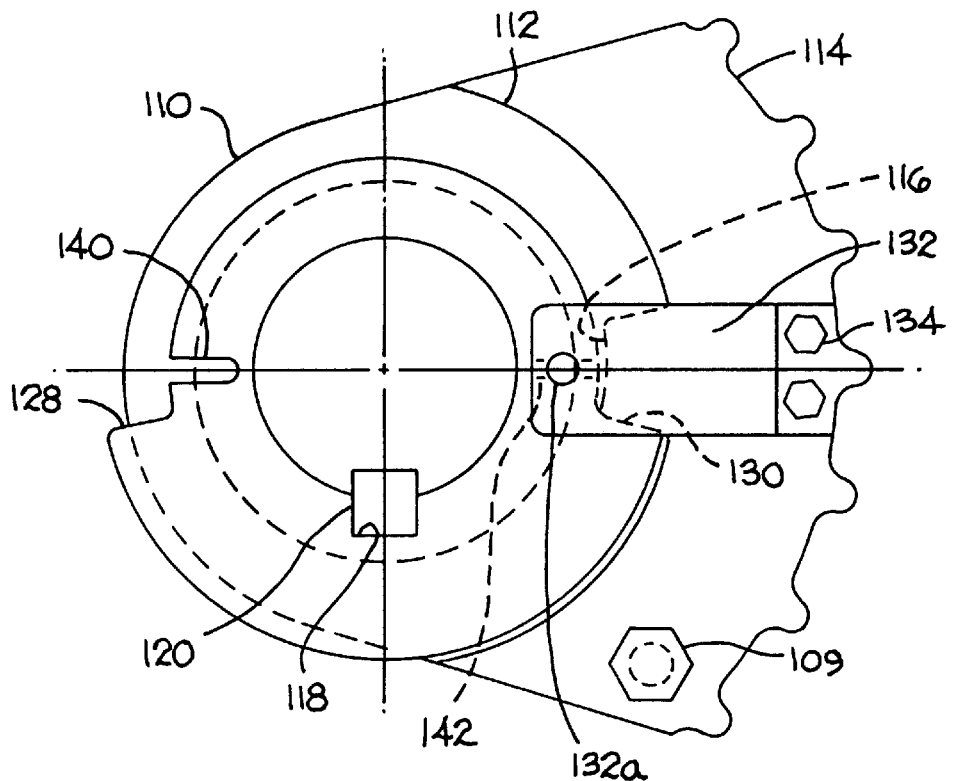
FIG. 7 is an end view of the vibratory eccentric weight assembly of FIG. 5.

The eccentric weight assembly is best described in connection with the perspective view of FIG. 5 and the views of FIGS. 6 and 7. As discussed above, two eccentric weight assemblies 100 and 101, are mounted on the center shaft 20. However, the details of the structures are essentially identical, one being a mirror image of the other; thus, for the sake of clarity only assembly 100 is shown and described in FIGS. 5–7. Eccentric weight assembly 100, as seen in FIG. 5, is comprised of a hub component 102 and a pair of eccentric weights 104, 106. The hub component 102 has a cylindrical pin 108 that is inserted through openings 104a and 106a allowing the eccentric weights 104 and 106 to ride upon and move as a unit with the rotating hub component 102. The eccentric weights 104, 106 are adjustable with respect to each other by relative movement of the weights by registering a selected one of the openings 105 in weight 104 to opening 107 in weight 106 and inserting securing bolt 109 through the registered openings. In this manner, the rotating unbalanced weight can be adjusted and the weights secured together for rotation as a unit. It should be noted that the same adjustment can typically be made to both the outboard weights as well as to the inboard weights.

While not intended to be limiting as to the shape and form of the weights, the weights 104, 106 are illustrated as having a "foot" shape with diverging sides leading from a "heel" region in which the openings 104a, 106a are located to the "toe" region which is the location of the eccentric mass. It should be noted that the heel region 110 of weight 106 has a region of diminished thickness and is bounded by an arcuate wall 112 leading to the toe region 114. The arcuate wall 112 preferably has a center of curvature located at the center of the opening 106a and additionally has a stop member 116 radially directed from approximately the mid-point thereof.

The hub component 102 defines an opening 102a adapted to receive the shaft 20 for rotating the eccentric weights 104, 106 and has a key way 118 adapted to receive a key 120 (see FIG. 7) to lock the hub component to the shaft 20. The cylindrical pin 108 of the hub component 102 fits within the openings 104a, 106a of the eccentric weights 104, 106 and provides a bearing surface for the periodic movement of the weights with respect to the hub component 102. The hub component 102 is secured in place by retaining ring 122 snapped into a circumferentially extending groove 124 at the distal end of the pin 108. The other end of the pin 108 is integrally connected to a retaining member 126 in the shape of two co-planar half disks 126a, 126b of different radii. The smaller half disk 126a has a radius slightly greater than the opening 106a and the larger half disk 126b has a radius slightly less than the radius of the arcuate wall 112. Because of the differential in radius existing between the disks 126a and 126b, a pair of connecting shoulders 128 and 130 are formed which function to periodically abut the stop member 116 of the weight 106 as described more fully below. As may be best seen in FIG. 6, the retaining member 126 is complimentary in configuration to the heel portion 110 and the collective thickness of the heel portion 110 and retaining member 126 is about the same thickness as the toe portion 114. The retaining member 126 is able to rotate under certain conditions from a first position where the shoulder 128 abuts one side of the stop member 116 to a second position where the shoulder 130 abuts the other side of the stop member 116. For purposes of this description, the relative rotation is shown to be about 180°. However, other and different angular limits may be used as desired as long as it provides for sufficient repositioning of the weights to effect reversal of movement of the product conveyed by the system.

While it would appear that the eccentric weight would continue to always rotate with the shaft once the stop member 116 has encountered one or the other of the shoulders 128, 130, applicant has observed a phenomena in which the weight tends to slowly separate from the abutting shoulder during operation and becomes essentially located midway between the two shoulders. Such separation, if allowed to occur, would result in inappropriate angle of attack of the resulting force to the conveyor trough. To prevent this separation, applicant has further devised structure, a latching mechanism which releasably secures the weight to the shaft at the appropriate positions. This structure takes the form of a leaf spring 132 secured at one end to the weight 106 by a plurality of screws 134 or the like. A pair of spacer plates 136, 138 are used to space the spring 132 from the weight 106 and the heads of screws 134 as shown in FIG. 5. The free distal end of the spring 132 extends across the stop member 116 and over the facing surface of retaining member 126. A small projection or finger 132a (best seen in FIG. 6) is biased by the spring 132 against the surface of the retaining member 126 until it encounters and snaps into the one of a pair of grooves 140, 142 located near the juncture of the shoulders with the small disk 126a. The snapping of the finger 132a into the groove occurs at essentially the same time that one of the shoulders 128 or 130 of the retaining member 126 abuts against the stop member 116. The cooperation of the spring 132 and spring finger 132a with one or the other of the grooves 140, 142 provides sufficient force to resist movement of the weight relative to the shaft as long as the shaft continues to rotate in the predetermined direction. When the shaft 20 is stopped and then rotated in the other direction, the inertia of the weight resisting the sudden rotation of the shaft 20 causes the spring 132 and finger 132a to pull out of its associated groove and the eccentric weight 106 (and weight 104 if present) moves relative to the shaft 20 to the second position where the other shoulder engages the stop member 116 and the spring finger 132a encounters and snaps into the other groove.

Thus, in operation where it is suddenly necessary to reverse the flow of articles carried by the vibrating conveyor apparatus, an operator would first stop the vibrating apparatus. At this point the eccentric weight 106 is positioned in one or the other of the two positions, for example, the first predetermined position as illustrated in FIGS. 6 and 7 in which weight 106 is held in place by the interaction of the finger 132a of spring 132 and the groove 142. When the operator reverses the apparatus, causing the shaft 20 to rotate in the opposite direction, the rapid acceleration of the shaft to typical operating rotational speeds in excess of 900 rpm results in the disengagement or delatching of the finger 134 from and groove 140. The hub component then rapidly rotates until the shoulder 128 impacts against the stop member 116 and causes the weight to immediately start rotating with the shaft 20 and hub component 102. At the same time, finger 132a engages groove 140 and the weight is secured against relative rotation with respect to the hub component and shaft until the direction of rotation of the shaft is again changed.

It should be noted that the hub assembly as described acts as a small eccentric weight when rotated and must be considered together with the other eccentric weights in determining the proper positioning of the weights and phase relationships. This effect, however, has little bearing on the stop and latch structure of the present invention.

From a reading of the above, one with ordinary skill in the art should be able to devise variations to the inventive features. For example, a plurality of hub mechanisms could be used with associated sliding eccentric weights such as on the outboard shafts of a three shaft system to provide the proper reversal of the direction of movement of articles carried by the trough. The shaft itself could define the stop shoulders members to abut a stop member positioned on the eccentric weights. Various latching mechanisms may be employed to latch the weight to the hub or shaft while maintaining the requirement be that the mechanism delatch when the shaft rotation is reversed. For example, the stop member itself may be provided with a resilient or spring biased finger that rides over the arc of the surface of the smaller of the two half disks and engages a notch in the arc surface at the time the sides of the stop member engages one of the shoulders of the retaining member where reversing the rotation of the shaft would free the finger from the notch. These and other variations are believe to fall within the spirit and scope of the attached claims.

What is claimed is:

1. A vibrating conveyor apparatus for reversing the movement of articles carried by said apparatus comprising a conveying trough for moving articles through vibratory motion imparted to said trough;

a stationary frame;

a plurality of spring members mounting said trough on said frame;

a vibrating assembly for imparting vibratory motion to said trough, said assembly comprising a plurality of shaft components mounting eccentric weights adapted to be rotated to generate said vibratory motion, one of said shaft components mounting a first eccentric weight that is movable with respect to said one shaft component between a first predetermined latched position and a second predetermined latched position, said first eccentric weight and said shaft component having a latching mechanism that latches said first eccentric weight in said first predetermined latched position when said shaft component is rotated in a first direction and in said second predetermined latched position when said shaft component is rotated in a direction reverse to said first direction.

2. The vibrating assembly of claim 1, said first eccentric weight having a stop member on an inner surface, said shaft component including a retaining member having a pair of stop elements that respectively abut said stop member in said first and second predetermined positions.

3. The shaft component of claim 2, wherein the retaining member comprises a cylindrical pin and end member, said first eccentric weight mounted rotatably on said pin and abutting a surface of said end member, said end member defining a pair of stop walls as said stop elements.

4. The shaft component of claim 2, wherein the latching mechanism comprises a retention device secured to the first eccentric weight and two grooves defined at different positions on the retention member, said retention device engaging said grooves in said first and second predetermined positions.

5. The latching mechanism of claim 4, wherein the latching mechanism is a spring with a projection on one end thereof to engage said grooves, said spring biasing said projection into said grooves.

6. The latching mechanism of claim 5, wherein the spring and projection become disengaged from said grooves when said shaft has a change in the direction of rotation.

7. A vibrating conveyor apparatus for reversing the movement of articles carried by said apparatus comprising a conveying trough for moving articles through vibratory motion imparted to said trough;

a stationary frame;

a plurality of spring members mounting said trough on said frame;

a vibrating assembly for imparting said vibratory motion to said trough, said assembly including a plurality of shafts and associated eccentric weights for generating said vibratory motion and a hub assembly fixed to one of said shafts, said hub assembly mounting a first eccentric weight that is movable with respect to said hub assembly and said one shaft between a first position and a second position, said first eccentric weight having a first stop element and said hub assembly having a pair of spaced stop components, said stop element abutting one of said stop components when said first eccentric weight is in said first position and abutting an other of said stop components when said eccentric weight is in said second position, said first eccentric weight and said hub assembly collectively defining a latching mechanism that is activated when said stop element abuts said stop components and holds said first eccentric weight in respective said first and second positions and deactivated when a direction of rotation of said one shaft is reversed thereby allowing said first eccentric weight to move relative to said one shaft between said first and second positions.

8. The conveying apparatus of claim 7 in which said latching mechanism includes a spring member attached to said first eccentric weight with a finger on a free distal end of said spring and a pair of spaced grooves on a face of said hub assembly, said free distal end projecting out over said face with said spring biasing said finger against said face, said finger engaging said grooves when said first eccentric weight is in said first and second positions.

9. The conveying apparatus of claim 7 in which said hub assembly includes a pin axle and an end member, said eccentric weight mounted on said pin axle and abutting said end member.

10. The conveying apparatus of claim 9 in which said stop components are a pair of shoulders defined by said end member and spaced a predetermined angular distance apart and said stop element is a flange positioned on said first eccentric weight.

11. The conveying apparatus of claim 10 in which said latching mechanism includes a spring member attached to said first eccentric weight with a finger on a free distal end of said spring and a pair of spaced grooves on a face of said end member, said free distal end projecting out over said face with said spring biasing said finger against said face, said finger engaging said grooves when said first eccentric weight is in said first and second positions.

12. The conveying apparatus of claim 11 in which said spring member projects out over said flange and each of said grooves is located adjacent said respective shoulders defined by said end member.

13. A vibratory conveying apparatus comprising a conveying trough for moving articles through vibratory motion imparted to said trough;

a stationary frame;

a plurality of spring members mounting said trough on said frame;

a vibrating assembly for imparting said vibratory motion to said trough, said assembly including a central shaft and a pair of shafts parallel to and located on either side of said central shaft, said shafts operably connected to one another so that said central shaft rotates in the opposite direction to said pair of shafts, each of said pair of shafts mounting eccentric weights and said central shaft having at least one hub assembly fixed thereto, said hub assembly mounting a first eccentric weight that is movable with respect to said hub assembly and said central shaft between a first position and a second position, said first eccentric weight having a first stop element and said hub assembly having a pair of spaced stop components, said stop elements abutting one of said stop components when said first eccentric weight is in said first position and abutting an other of said stop components when said eccentric weight is in said second position, said first eccentric weight and said hub assembly collectively defining a latching mechanism that is
activated when said stop element abuts said stop components and holds said first eccentric weight in respective first and second positions and
deactivated when a direction of rotation of said central shaft is reversed and thereby allowing said first eccentric weight to move relative to said central shaft between said first and second positions.

\* \* \* \* \*